United States Patent
Tsukada

(10) Patent No.: US 8,023,736 B2
(45) Date of Patent: Sep. 20, 2011

(54) COLOR CORRECTION METHOD AND COLOR CORRECTION APPARATUS

(75) Inventor: Masato Tsukada, Tokyo (JP)

(73) Assignee: NEC Corporation, Tokyo (JP)

( * ) Notice: Subject to any disclaimer, the term of this patent is extended or adjusted under 35 U.S.C. 154(b) by 893 days.

(21) Appl. No.: 11/988,738

(22) PCT Filed: Jul. 12, 2006

(86) PCT No.: PCT/JP2006/313863
§ 371 (c)(1),
(2), (4) Date: Jan. 14, 2008

(87) PCT Pub. No.: WO2007/007788
PCT Pub. Date: Jan. 18, 2007

(65) Prior Publication Data
US 2009/0141976 A1    Jun. 4, 2009

(30) Foreign Application Priority Data
Jul. 13, 2005   (JP) ................................. 2005-204311

(51) Int. Cl.
*G06K 9/36* (2006.01)
(52) U.S. Cl. ......................... 382/173; 382/162
(58) Field of Classification Search .................. 382/162, 382/167, 173, 190, 224; 358/516, 518, 520
See application file for complete search history.

(56) References Cited

U.S. PATENT DOCUMENTS

| | | | |
|---|---|---|---|
| 6,549,653 | B1 | 4/2003 | Osawa et al. |
| 6,560,358 | B1 * | 5/2003 | Tsukada ....................... 382/167 |
| 2002/0054237 | A1 | 5/2002 | Nichogi | |

FOREIGN PATENT DOCUMENTS

| | | |
|---|---|---|
| EP | 1471747 | 10/2004 |
| JP | 62-265885 | 11/1987 |
| JP | 3-148989 | 6/1991 |
| JP | 7-95424 | 4/1995 |
| JP | 8-201884 | 8/1996 |

(Continued)

OTHER PUBLICATIONS

Hosoi et al., "Face Detection Based on Generalized Learning Vector Quaritization", Technical Report of The Institute of Electronics, Informatio and Communication Engineers, 2003, vol. 102 No. 651, pp. 47-52.

(Continued)

*Primary Examiner* — Duy M Dang
(74) *Attorney, Agent, or Firm* — Young & Thompson

(57) ABSTRACT

A color correction method in which an input image is corrected to generate an output image with an illumination condition different from that in the input image includes: detecting a region of a particular subject from the input image to extract color information on the region; restoring a spectral distribution of illumination in the input image by using the extracted color information and a surface reflectance of the particular subject designated in advance, calculating a spectral distribution of illumination in the output image by using the restored spectral distribution of illumination in the input image and the spectral distribution of designated target illumination, and calculating color information on each pixel of the output image on the basis of color information on each pixel of the input image, the restored spectral distribution of illumination in the input image and the calculated spectral distribution of illumination in the output image.

19 Claims, 8 Drawing Sheets

FIG. 7

FOREIGN PATENT DOCUMENTS

| | | |
|---|---|---|
| JP | 8-221591 | 8/1996 |
| JP | 9-172649 | 6/1997 |
| JP | 11-283025 | 10/1999 |
| JP | 11-289548 | 10/1999 |
| JP | 2001-8220 | 1/2001 |
| JP | 2001-78202 | 3/2001 |
| JP | 2001-148863 | 5/2001 |
| JP | 2001-311666 | 11/2001 |
| JP | 3264273 | 12/2001 |
| JP | 2002-238056 | 8/2002 |
| JP | 2003-46795 | 2/2003 |
| JP | 2003-189325 | 7/2003 |
| JP | 2003-216936 | 7/2003 |
| JP | 2003-224867 | 8/2003 |
| JP | 2003-317084 | 11/2003 |
| JP | 2003-333616 | 11/2003 |
| JP | 2004-180114 | 6/2004 |
| JP | 2004-320285 | 11/2004 |
| JP | 2005-27277 | 1/2005 |

OTHER PUBLICATIONS

Tajima, "Image Enginering Series 10: Color Image Replicaiton Theory, Fundamentals of Color Management", Maruzen Co. Ltd., Sep. 30, 1996, pp. 33-39.

The Color Science Association of Japan, "Color Science Handbook New Edition", Second Edition, University of Tokyo Press, Jun. 10, 1998, pp. 69-71.

Extended European Search Report dated May 25, 2011, Application No. 06768127.0.

H.Z. Hel-Or and B.A. Wandell: "Object-based illumination classification", Pattern Recognition, Elsevier, GB; vol. 35, No. 8, dated Aug. 1, 2002.

Ted Cooper: "Color Segmentation as an Aid to White Balancing for Digital Still Cameras", Proceedings of Spie, Spie, USA; vol. 4300, dated Jan. 1, 2001.

Laurence T. Maloney and Brian A. Wandell: "Color constancy: a method for recovering surface spectral reflectance", Journal of the Optical Society of America; vol. 3, No. 1, dated Jan. 1, 1986.

* cited by examiner

COLOR CORRECTION METHOD AND COLOR CORRECTION APPARATUS

TECHNICAL FIELD

The present invention relates to a method and apparatus for making a color correction to a color image and, more particularly, to a color correction method and a color correction apparatus including making a white balance correction to a color image on the basis of color information obtained from a region of a subject in the color image.

RELATED ART

Color correction methods for images have been proposed to improve the image quality of digital images. In making a color correction to a digital color image in particular, adjustment of white balance is important. Various techniques have been proposed as color correction methods including adjustment of white balance. For example, JP-A-2001-148863 describes a method in which white balance parameters calculated in advance by using a histogram for an image are applied to a skin color region in the image and the parameters are determined on the basis of whether or not a preferable skin color results. In a case where the resulting skin color is not preferable, maintaining the unprocessed state, i.e., nonexecution of color correction, is selected. JP-A-11-289548, JP-A-3-148989 and JP-A-62-265885 also describe methods for realizing white balance correction by using a histogram of an image.

JP-A-2003-224867 describes a method in which only a gray or skin-color region in an image is extracted, or gray and skin-color regions in an image are extracted by using a histogram of the image, the color temperature of the light source is estimated by using color information on the extracted region, and white balance of the image signal for the color image is corrected on the basis of the estimated color temperature using the following correction equations:

$$R'=\alpha R \quad (A1),$$

$$G'=\beta G \quad (A2),$$

$$B'=\gamma B \quad (A3).$$

Where, R, G and B represent RGB values of pixels of an input image, R', G' and B' represent RGB values of pixels of an output image, and $\alpha$, $\beta$ and $\gamma$ are coefficients used in correction.

JP-A-2003-333616 also describes a method in which a region of a chromatic color such as a skin color and a region considered to be an originally white region in an image are obtained by histogram analysis on the image, and the color temperature of the light source is estimated by using one color information item or a combination of color information items on each region to achieve white balance correction.

In the above-described related arts, attention is paid to a region of a chromatic color such as a skin color and a region of an achromatic color such as gray or white in an image, and an objective region in the image required to determine parameters used when a white balance correction is made is obtained by histogram analysis on the image.

A method of correcting image quality by detecting a face region as an objective region in an image has been proposed. For example, JP-A-2004-320275 describes a method of controlling the shutter speed and the auto-focus (AF) operation of a digital camera according to the size and number of face regions in an image as a technique to improve the image quality of an image taken with a digital still camera. JP-A-2004-320275 mentions contour enhancement processing and skin-color processing on face regions but does not concretely describe a processing method for skin-color processing considered important.

JP-A-2004-180114 describes a color correction method for improving a skin color in a face region detected on the basis of only color information in a color image. JP-A-2003-216936 describes a technique of detecting face parts of a human figure and these positions from an input image, setting boundaries between the human figure region and other regions and performing white balancing and chromaticity correction suitable for each region. JP-A-2003-189325 describes a method in which color information on a face region is not used in white balance computation.

JP-A-2005-027277 describes a method in which the location of a face region of a person in an image is determined; a correction coefficient for changing a skin color obtained from the image is determined such that a skin color obtained from the determined face region generally coincides with a known skin color range; and white balance adjustment on the image is performed by using the correction coefficient. JP-A-2005-027277 describes use of the gray-world hypothesis and white point estimation as a correction method considered important but describes no corresponding concrete techniques.

JP-A-2003-317084 describes a method of detecting eyes from an image. JP-B-3264273 describes a method of determining a skin color using a histogram.

Reference documents cited in this specification are listed below.

[Patent Document 1] Japanese Patent Laid-Open Publication No. 2001-148863 (JP-A-2001-148863),
[Patent Document 2] Japanese Patent Laid-Open Publication No. 11-289548 (JP-A-11-289548),
[Patent Document 3] Japanese Patent Laid-Open Publication No. 3-148989 (JP-A-3-148989),
[Patent Document 4] Japanese Patent Laid-Open Publication No. 62-265885 (JP-A-62-265885),
[Patent Document 5] Japanese Patent Laid-Open Publication No. 2003-224867 (JP-A-2003-224867),
[Patent Document 6] Japanese Patent Laid-Open Publication No. 2003-333616 (JP-A-2003-333616),
[Patent Document 7] Japanese Patent Laid-Open Publication No. 2004-320285 (JP-A-2004-320285),
[Patent Document 8] Japanese Patent Laid-Open Publication No. 2004-180114 (JP-A-2004-180114),
[Patent Document 9] Japanese Patent Laid-Open Publication No. 2003-216936 (JP-A-2003-216936),
[Patent Document 10] Japanese Patent Laid-Open Publication No. 2003-189325 (JP-A-2003-189325),
Patent Document 11: Japanese Patent Laid-Open Publication No. 2005-27277 (JP-A-2005-027277),
Patent Document 12: Japanese Patent Laid-Open Publication No. 2003-317084 (JP-A-2003-317084),
[Patent Document 13] Japanese Patent No. 3264273 (JP-B-3264273),
[Non-patent Document 1] Toshinori HOSOI, Tetsuaki SUZUKI, Atsushi SATO, "Face detection based on Generalized Learning Vector Quantization," Technical Report of The Institute of Electronics, Information and Communication Engineers, 2003, Vol. 102, No. 651, pp. 47-52,
[Non-patent Document 2] Johji TAJIMA, "Image engineering series 10: Color image replication theory, fundamentals of color management," MARUZEN Co. Ltd., Sep. 30, 1996, pp. 33-39, Non-patent Document 3: The Color Science Association of Japan, "Color science handbook, new edition," Second Edition, University of Tokyo Press, Jun. 10, 1998, pp. 69-71.

DISCLOSURE OF THE INVENTION

Problem to be Solved by the Invention

In making a white balance correction to an image for the purpose of improving image quality, there is a need to grasp color information on an objective region in the image in order to determine parameters for white balance correction. To realize this, the related art uses a method of obtaining a region of a chromatic color such as a skin color and a region of an achromatic color such as gray or white in an image by histogram analysis.

However, the method of obtaining a region of a chromatic color such as a skin color and a region of an achromatic color such as gray or white in an image by histogram analysis has a problem with its accuracy. In detecting a region of a skin color in an image, there is a need to permit a skin color region of a certain wide area by considering variation in illumination color and other factors. Therefore, if a region occupied in the image by an object having a color similar to the skin color other than human figures is large, color information obtained from the region of that object other than color information obtained from the face regions of the actual human figures in the image is erroneously detected as a human figure skin color, resulting in failure to make the desired color correction. Also, it is difficult to detect a region considered to be originally white or gray from an image with a serious color cast by using only image data as a clue. Further, there is a possibility of occurrence of a blown-out highlight due to exceeding the dynamic range of the camera at the time of image taking. To detect a region considered to be originally white or gray from an image in which such a blown-out highlight exists, threshold processing for eliminating the blown-out highlight region is introduced at the time of histogram analysis. However, it is difficult to automatically set a threshold value for eliminating the blown-out highlight region. It is, therefore, difficult to automatically achieve good white balance correction in any image in which a blown-out highlight has occurred.

Thus, there is a problem that when an objective region in an image is identified by using histogram analysis, the white balance correction function cannot be performed as desired due to failure to correctly grasp color information on the objective region in the image required for computation of correction parameters necessary for white balance correction.

Further, in white balance correction in the related art, processing for correcting the proportions of R, G, and B components independently of each other by equations (A1) to (A3) is used for the purpose of adjusting the balance among the R, G and B components in an image expressed by three primary colors R, G and B. In such a case, however, there is a problem that a satisfactory white balance correction cannot be made because there is a limit to the degree of freedom of correction.

It is, therefore, an object of the present invention to provide a color correction method which solves the above-described problems at a time and which realizes effective automatic color correction to an input image on the basis of one frame of the input image.

Another object of the present invention is to provide a color correction apparatus which realizes effective automatic color correction to an input image on the basis of one frame of the input image.

That is, the present invention provides a color correction method and apparatus which achieve an improvement in accuracy of color correction including white balance correction by solving the above-described problems with the method in which color information on an objective region in an image is obtained by image histogram analysis to make a white balance correction, and which ensure the desired function by solving the problems with the white balance correction method in the related art that a satisfactory white balance correction cannot be made due to a limit to the degree of freedom of correction.

Means for Solving the Problem

The first object of the present invention is achieved by a color correction method in which an input image is corrected to generate an output image with an illumination condition different from an illumination condition in the input image, the method including: detecting a region of a particular subject from the input image and extracting color information on the region; restoring a spectral distribution of illumination in the input image by using the extracted color information on the region of the particular subject and a surface reflectance of the particular subject designated in advance; calculating a spectral distribution of illumination in the output image by using the restored spectral distribution of illumination in the input image and the spectral distribution of illumination designated as target illumination; and calculating color information on each pixel of the output image on the basis of color information on each pixel of the input image, the restored spectral distribution of illumination in the output image and the calculated spectral distribution of illumination in the output image.

The second object of the present invention is achieved by a color correction apparatus which corrects an input image to generate an output image with an illumination condition different from an illumination condition in the input image, the apparatus including: subject region color information extraction means for detecting a region of a particular subject from the input image and extracting color information on the region; spectral distribution restoration means for restoring a spectral distribution of illumination in the input image by using the color information on the region of the particular subject extracted by the subject region color information extraction means and a surface reflectance of the particular subject designated in advance; spectral distribution calculation means for calculating a spectral distribution of illumination in the output image by using the spectral distribution of illumination in the input image restored by the spectral distribution restoration means and the spectral distribution of illumination designated as target illumination; and output image generation means for calculating color information on each pixel of the output image on the basis of color information on each pixel of the input image, the restored spectral distribution of illumination in the output image and the calculated spectral distribution of illumination in the output image.

The scope of the present invention includes a program for making a computer execute each of the above-described image identification methods according to the present invention, a program product formed of such a program, a recording medium on which such a program is stored and a transmission medium which transmits such a program.

According to the present invention, the calculation accuracy with which correction parameters necessary for color correction including white balance correction is improved. In this way, not only an improvement in color correction accuracy but also relaxation of the limit to the degree of freedom of color correction are achieved to realize color correction with the desired effect.

DESCRIPTION OF REFERENCE NUMERALS

1 Input image;
2 Output image;
3 Subject region detector;
4 Subject region color information extractor;
5 Spectral distribution restoration unit;
6 Subject surface reflectance memory;
7 Subject surface reflectance restoration unit;
8 Spectral distribution calculator;
9 Spectral distribution memory;
10 Image correction unit;
11 Controller;
12 Matrix transform image correction unit;
20 Slide bar;
21 Control point;
100 to 102 Color correction apparatuses.

BEST MODE FOR CARRYING OUT THE INVENTION

Figure 1:
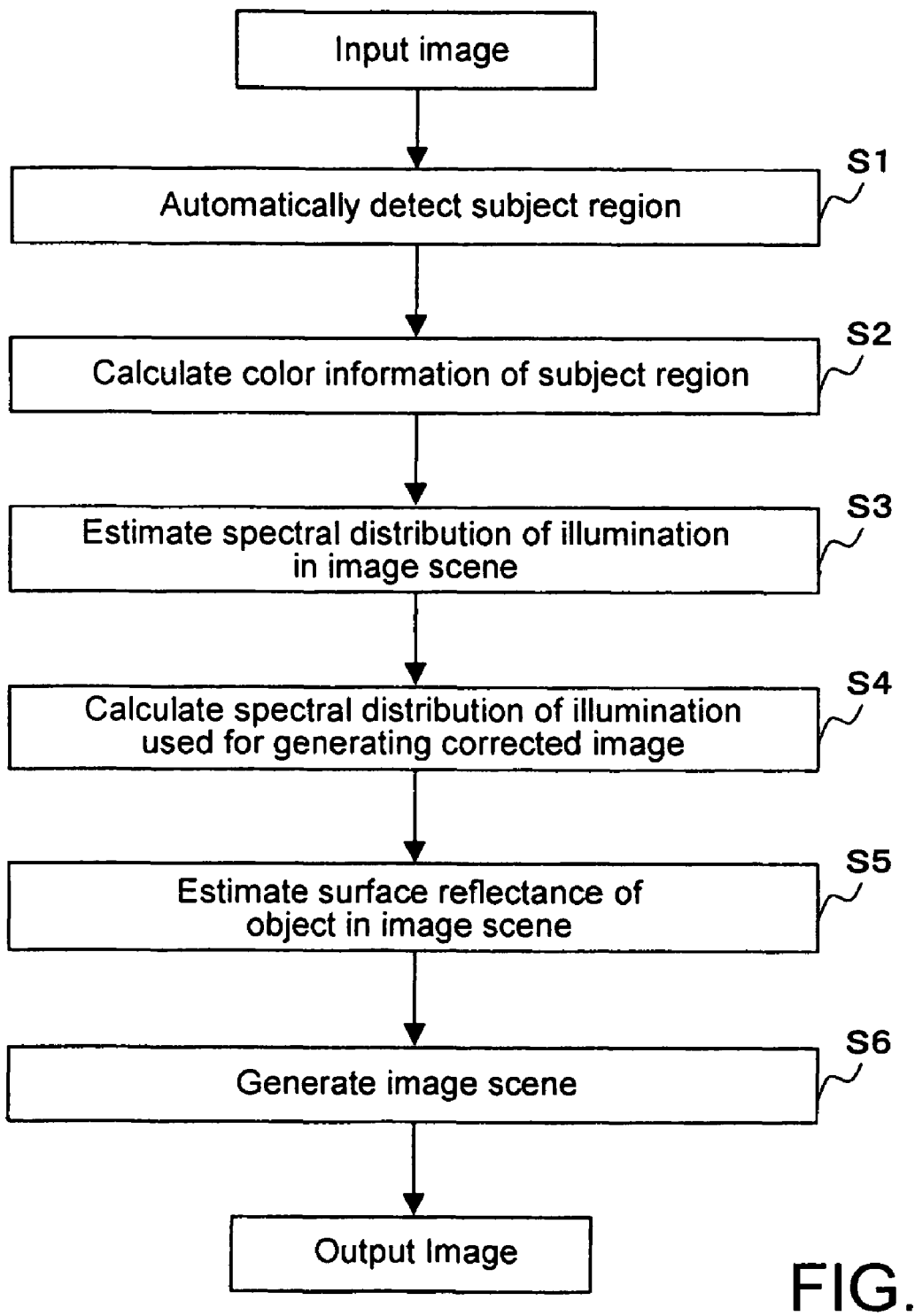
FIG. 1 is a flowchart showing color correction method according to a first exemplary embodiment of the present invention.

FIG. 1 shows the procedure of processing according to a color correction method in a first exemplary embodiment of the present invention. In this description, it is assumed that the color system for images is the RGB color system for convenience of explanation. That is, colors of an image are expressed by combinations of R (red), G (green) and B (blue) denoted as color information RGB.

The color correction method in the present exemplary embodiment is a method of automatically extracting a particular region from an input image when the input image is given, correcting the input image on the basis of color information of the extracted particular region and designated target illumination, generating an output image with an illumination condition different from the illumination condition in the input image, and outputting the output image.

Improving the accuracy of color correction requires determining parameters for color correction with accuracy. In step S1, according to the method in the present exemplary embodiment, a region of a subject whose color can be roughly identified is first detected automatically from an input image arbitrarily given. As a subject whose color can be roughly identified, one having no or small variation in color and having spectral information in the region of light visible to humans (with wavelength of 400 to 700 nm) is preferred. Further, one having shape and pattern features as well as the color features is preferred. In the explanation made below, a region detected as a region of a subject is referred to simply as "subject region" as occasion demands.

Figure 2:
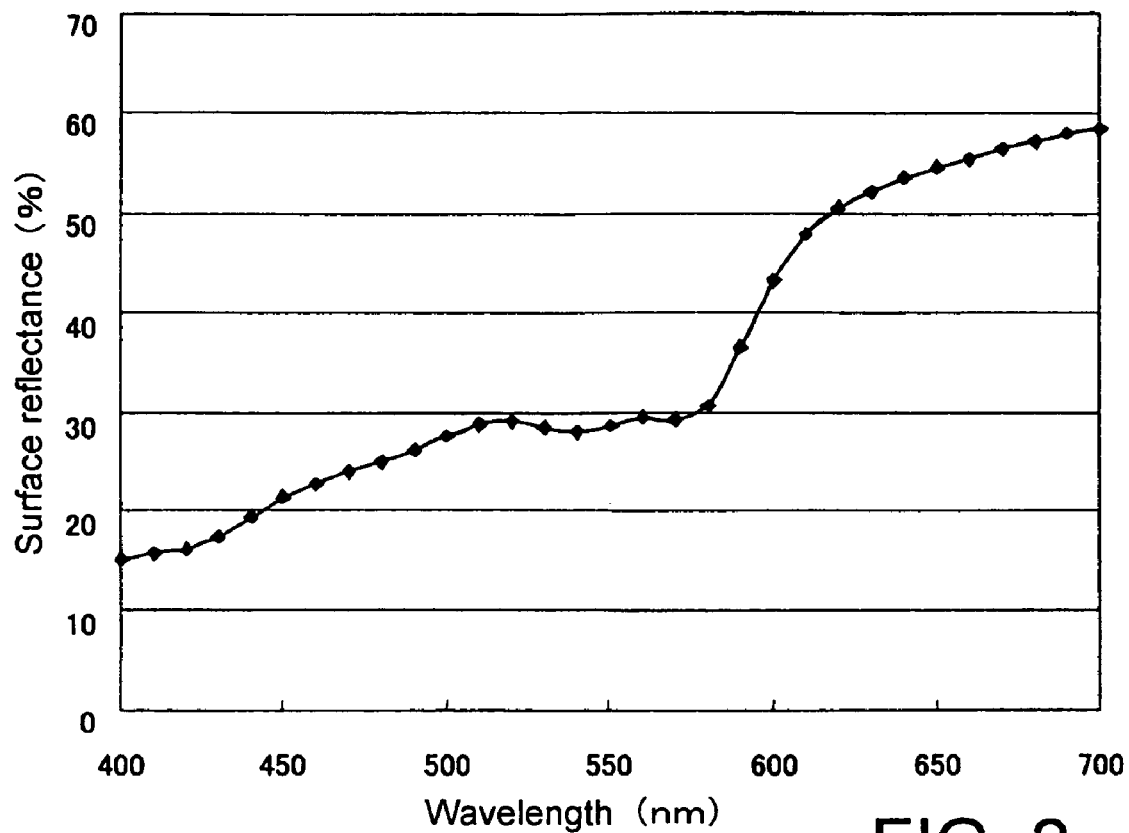
FIG. 2 is a graph showing an average spectral characteristic (surface reflectance) of face regions of Japanese people.

As a subject having such features, a human face for example can be used. FIG. 2 is a graph showing an average spectral characteristic (surface reflectance) of face regions of Japanese people. As shown in FIG. 2, a spectral characteristic in a human face region has spectral information through the entire visible light region. The color of human face regions varies among individuals but it can be said that it is comparatively stable.

Needless to say, a face region has shape features such as the eyes, the nose and the mouth. In JP-A-2003-317084, a method of detecting eyes in an image is proposed as a method of detecting a face region from an input image. If the positions of eyes are detected, a face region can be easily determined presumably. As a face detection method, a method which is described in Toshinori HOSOI, Tetsuaki SUZUKI, Atsushi SATO, "Face detection based on Generalized Learning Vector Quantization," Technical Report of The Institute of Electronics, Information and Communication Engineers, 2003, Vol. 102, No. 651, pp. 47-52, and which is a combination of an image-based method using generalized learning vector quantization and a feature-based method of detecting eyes, can also be used.

In each of the above two techniques, it is possible to improve the accuracy of detection of a face region by performing face detection by using monochromic information and adding determination as to whether or not the face region as a result of the detection is a skin color. As a method of determining a skin color, a method using an image histogram described in JP-B-3264273 can be used. The face detection methods usable in the present exemplary embodiment are not limited to the above-described two techniques. Other techniques may be used in the present exemplary embodiment.

While the explanation has been made with respect to a case where a subject automatically detected from an input image arbitrarily given is a face, subjects other than faces are also possible. For example, for automatic detection of subjects other than faces, a method of automatically detecting a subject by comparing visual feature information on a subject stored in advance with visual feature information in image data can be used.

Figure 3:
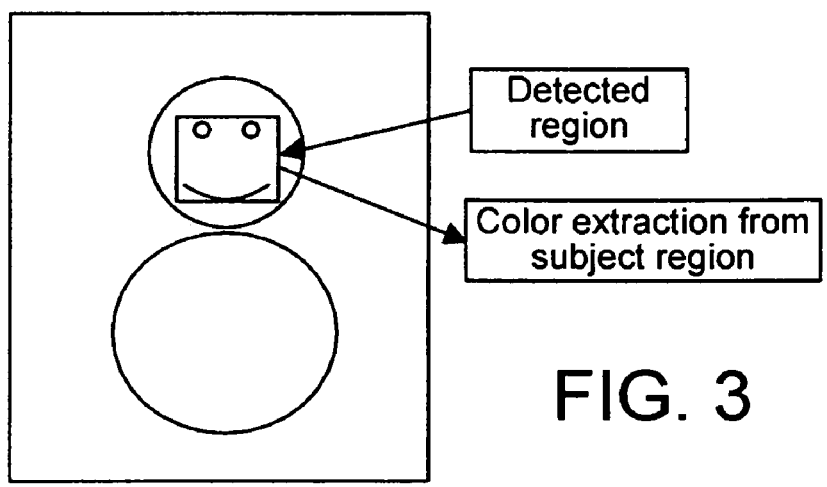
FIG. 3 is a diagram showing the outline of processing for automatically detecting a region of a subject and obtaining color information.

Next, in step S2, color information on the region of the subject automatically detected from the input image is obtained. FIG. 3 shows the outline of processing for automatically detecting a region of a subject in an input image and obtaining color information. In this figure, a case where a region of a face portion is extracted from an input image and color information is obtained from the extracted region is illustrated. As color information on the region of the subject, the average color, the median color (median), the most frequent color (mode) existing in the region occupied by the subject may be used.

In step S2, color information RGB on the region of the subject is obtained and tristimulus values XYZ in the XYZ color system are obtained on the basis of the obtained RGB. Each pixel of the input image can be expressed by the RGB values. However, explanation will be made by assuming that the chromaticities of RGB phosphors for displaying the input image and the chromaticity of white are designated in advance, and that the relationship between RGB value data and the intensity of the light emitted from the display device is linear. In this case, the relationship between the RGB values of the input image and tristimulus values XYZ is expressed by the following equation (1):

$$\begin{pmatrix} X \\ Y \\ Z \end{pmatrix} = RX \begin{pmatrix} R \\ G \\ B \end{pmatrix}. \quad (1)$$

Where, RX is a 3×3 transform matrix. The transform matrix RX can be uniquely calculated if the chromaticities of the RGB phosphors and the chromaticity of white are determined. For example, as a method of calculating the transform matrix RX, a method disclosed in Johji TAJIMA, "Image engineering series 10: Color image replication theory, fundamentals of color management," MARUZEN Co. Ltd., Sep. 30, 1996, pp. 33-39 can be used. In this document, a method of calculating a transform matrix RX in a relational expression of RGB of an input image and tristimulus values XYZ is described.

Subsequently, in step S3, the spectral characteristics of illumination in the image scene are restored from the color information on the subject region in the input image, i.e., tristimulus values XYZ computed in step S2, and color information that the subject region generally has. As the color information that the subject region generally has, the surface reflectance designated in advance with respect to a particular subject is used. The illumination in the image scene is illumination (a light source) which illuminates an object in the image. Tristimulus values XYZ representing the color of an object based on the XYZ color system are expressed by the following equations (2) to (4) from the surface reflectance of an object, the spectral distribution of the illumination illuminating the object and a color matching function with respect to the human visual sense.

$$X = \int I(\lambda) R(\lambda) x(\lambda) d\lambda \quad (2),$$

$$Y = \int I(\lambda) R(\lambda) y(\lambda) d\lambda \quad (3),$$

$$Z = \int I(\lambda) R(\lambda) z(\lambda) d\lambda \quad (4).$$

Where, $\lambda$ is the wavelength, $I(\lambda)$ is the spectral distribution of the illumination in the input image; $R(\lambda)$ is the surface reflectance of the object; and $x(\lambda)$, $y(\lambda)$ and $z(\lambda)$ are color matching functions, which are known functions. Integration is performed through the wavelength region of visible light.

Tristimulus values XYZ already calculated in step S2 are substituted in the left sides of equations (2) to (4). Equations (2) to (4) then become observation equations about unknown characteristics $I(\lambda)$ and $R(\lambda)$. At this stage, however, unknown characteristics $I(\lambda)$ and $R(\lambda)$ cannot be calculated from equation (3).

If surface reflectance $R(\lambda)$ representing the color of the subject can be limited or determined in advance even in a state of including a certain error, $R(\lambda)$ is a known value and equations (2) to (4) become observation equations of $I(\lambda)$ only. For example, if the subject is a Japanese person's face, surface reflectance $R'(\lambda)$ of the face region of a Japanese having an average skin color shown in FIG. 2 by way of example can be used as $R(\lambda)$ in equations (2) to (4). Even in a case where the subject is an object other than the face, an average or a typical surface reflectance of the object may be obtained in advance and substituted for $R(\lambda)$ in equations (2) to (4).

Essentially speaking, spectral distribution $I(\lambda)$ cannot be analytically calculated from equations (2) to (4) because it is expressed in infinite dimensional waveform in the visible light region.

Figure 4:
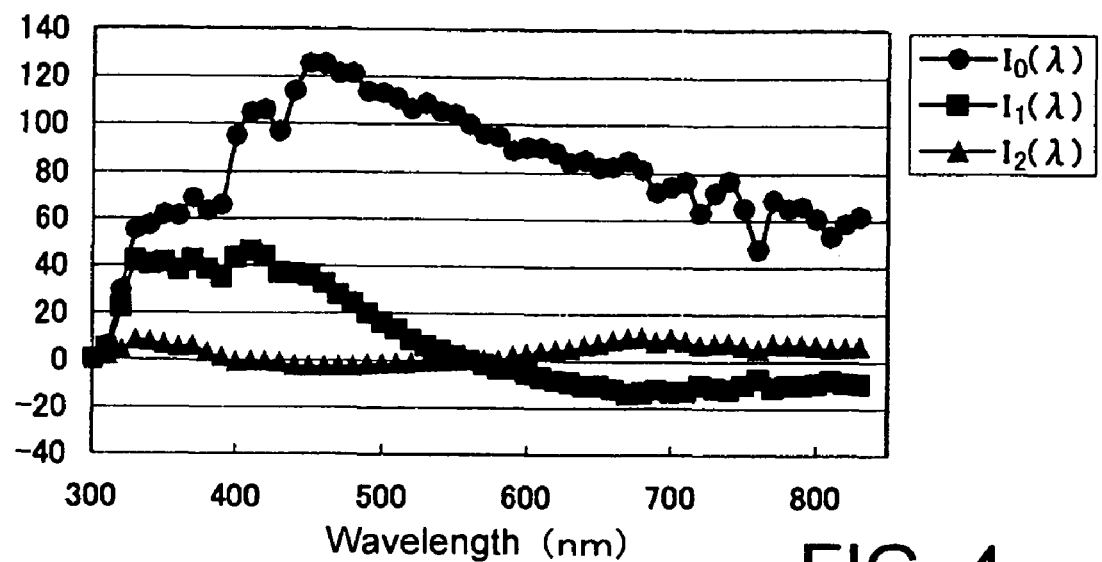
FIG. 4 is a graph showing average and the first and second principal component vectors of CIE daylight.

Incidentally, CIE daylight is a light source for colorimetry specified by a relative spectral distribution by CIE (International Commission on Illumination) and it is known that CIE daylight is well approximated by the linear sum of an average and two principal components. FIG. 4 is a graph showing the average and the first and second principal component vectors of CIE daylight. Then spectral distribution $I(\lambda)$ of illumination can be expressed as follows:

$$I(\lambda) = I_0(\lambda) + a_1 I_1(\lambda) + a_2 I_2(\lambda) \quad (5).$$

$I_i(\lambda)$ (i=0 to 2) shown in equation (5) represents the average and basic vectors of the illumination shown in FIG. 4, and $a_i$ (i=1 to 2) represents weight coefficients of the basic vectors, which are characteristic parameters expressing the color of the illumination.

$I(\lambda)$ shown by equation (5) is substituted in equations (2) to (4) to obtain linear simultaneous equations with two unknowns about unknown characteristic parameters $a_1$ and $a_2$ expressing the color of the illumination, by which $a_1$ and $a_2$ can be easily calculated. Obtained characteristic parameters $a_1$ and $a_2$ are substituted in equation (5) to obtain the spectral distribution of the illumination in the image scene. The spectral distribution of the illumination in the image scene obtained by the above-described procedure is assumed to be $I_{org}(\lambda)$.

Subsequently, in step S4, spectral distribution $I_{adj}(\lambda)$ of illumination actually used at the time of correction of the color of the image is calculated from spectral distribution $I_{target}(\lambda)$ of target illumination set in advance as a target of correction and spectral distribution $I_{org}(\lambda)$ estimated as the illumination in the image scene. As spectral distribution $I_{target}(\lambda)$ of target illumination set in advance as a target of correction, the spectral distribution of standard light source D65 or D55, the spectral distribution of illumination with which a good correction effect has been empirically confirmed, a spectral distribution having illumination light not for white balancing but for the effect of changing the color of an entire image, or the like may be used. Any spectral distribution other than these may also be used. A user may determine the spectral distribution of the target illumination as a spectral distribution according to his or her preference.

Spectral distribution $I_{target}(\lambda)$ of the target illumination may be directly used as $I_{adj}(\lambda)$. Further, spectral distribution $I_{adj}(\lambda)$ of illumination actually used at the time of correction of the color of the image may be calculated by mixing spectral distribution $I_{org}(\lambda)$ estimated as the illumination in the image scene and spectral distribution $I_{target}(\lambda)$ of the target illumination, as shown by the following equation (6):

$$I_{adj}(\lambda) = (1-adj) \times I_{org}(\lambda) + adj \times I_{target}(\lambda) \quad (6).$$

In equation (6), adj is a real coefficient for controlling the mixing ratio of $I_{org}(\lambda)$ and $I_{target}(\lambda)$. Further, to enable control at each wavelength of the mixing ratio of spectral distribution $I_{org}(\lambda)$ estimated as the illumination in the image scene and spectral distribution $I_{target}(\lambda)$ of the target illumination, $$I_{adj}(\lambda) = (F(\lambda) - adjw(\lambda)) \times I_{org}(\lambda) + adjw(\lambda) \times I_{target}(\lambda) \quad (7)$$

may be used. In this equation, F(λ) is a constant waveform which is 1.0 in the visible light region, and adjw(λ) is a function in the visible light region having the real value for controlling the mixing ratio of $I_{org}(\lambda)$ and $I_{target}(\lambda)$ at each wavelength.

Subsequently, in step S5, the surface reflectance of the object in each pixel of the input image is obtained. Tristimulus values XYZ are calculated from the RGB values of each pixel of the image are calculated according to equation (1) and are substituted in the left sides of equations (2) to (4). Spectral distribution $I_{org}(\lambda)$ of the illumination in the image scene calculated in step S3 is also substituted in the right sides of equations (2) to (4). Equations (2) to (4) then become observation equations about the surface reflectance R(λ).

Ideal surface reflectance R"(λ) of the object is also expressed in infinite dimensional waveform in the visible light region, as is the spectral reflection of the illumination. Therefore, ideal surface reflectance R"(λ) cannot be analytically calculated from equations (2) to (4). Ideal surface reflectance R"(λ) is modeled as shown below by using a finite dimensional linear model expressed by the weighted sum of lower-order basic vectors:

$$R''(\lambda) = r_0(\lambda) + b_1 r_1(\lambda) + b_2 r_2(\lambda) + b_3 r_3(\lambda) \quad (8)$$

Figure 5:
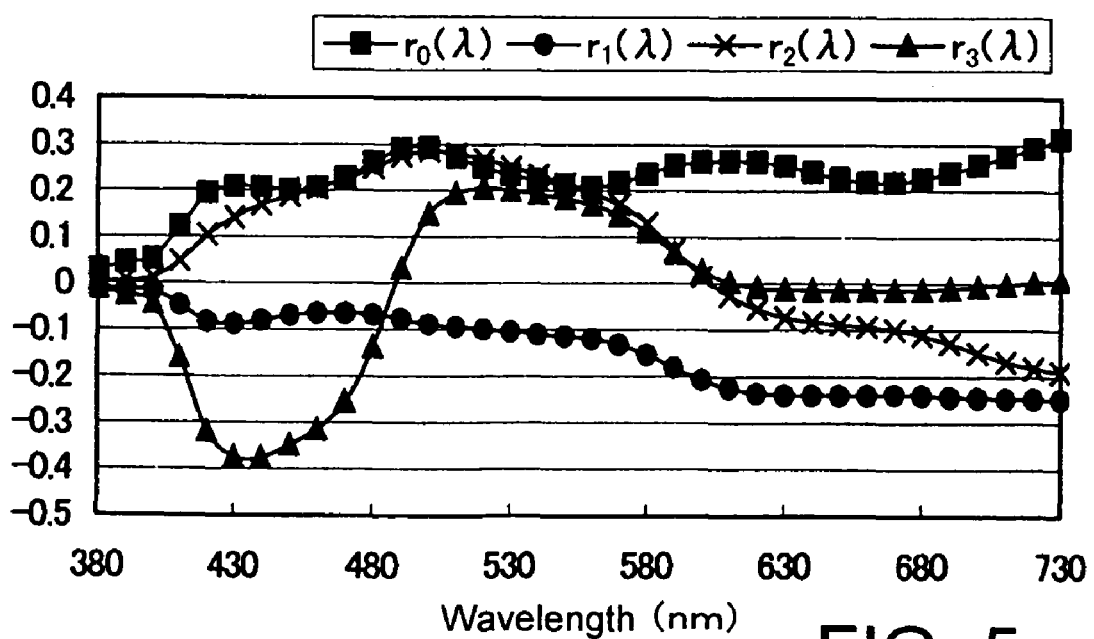
FIG. 5 is a graph showing an example of basic vectors obtained by collecting the surface reflectances of objects and performing principal component analysis on them.

FIG. 5 is a graph showing an example of basic vectors obtained by collecting the surface reflectances of objects and performing principal component analysis on them. Symbol $r_i(\lambda)$ (i=0 to 3) shown in equation (8) represents basic vectors obtained by collecting the reflectances of a number of objects and performing principal component analysis on them. These vectors $r_i(\lambda)$ are the average and first to third principal component vectors, respectively, and are all known. Symbol $b_i$ (i=0 to 3) represents weight coefficients of the basic vectors, which are unknown characteristic parameters expressing the colors of the objects.

R"(λ) shown by equation (8) is substituted in the observation equations about the surface reflectance R(λ) to obtain following equation (9) for linear simultaneous equations with three unknowns about unknown characteristic parameters $b_1$ to $b_3$ expressing the colors of the objects:

$$\begin{pmatrix} b_1 \\ b_2 \\ b_3 \end{pmatrix} = \begin{pmatrix} M(x, r_1) & M(x, r_2) & M(x, r_3) \\ M(y, r_1) & M(y, r_2) & M(y, r_3) \\ M(z, r_1) & M(z, r_2) & M(z, r_3) \end{pmatrix}^{-1} \begin{pmatrix} X - M(x, r_0) \\ Y - M(y, r_0) \\ Z - M(z, r_0) \end{pmatrix} \quad (9)$$

Where, $M(x, r_i)$ (i=0 to 3) represents integral term of $\int I_{org} r_i(\lambda) X(\lambda) d\lambda$. The same applies for y and z. The above-described processing is performed on all the pixels in the image to obtain the surface reflectances of all the objects in the image scene.

Next in step S6, the colors of the pixels of the input image after correction are calculated. Spectral distribution $I_{adj}(\lambda)$ of the illumination calculated in step S4 in advance to be used at the time of correction is substituted in equations (2) to (4) to obtain equations (10) to (12) about tristimulus values X'Y'Z' after correction and ideal surface reflectance R"(λ) of the objects already calculated in step S5.

$$X' = \int I_{adj}(\lambda) R''(\lambda) x(\lambda) d\lambda \quad (10),$$

$$Y' = \int I_{adj}(\lambda) R''(\lambda) y(\lambda) d\lambda \quad (11),$$

$$Z' = \int I_{adj}(\lambda) R''(\lambda) z(\lambda) d\lambda \quad (12).$$

If the inverse matrix of the transform matrix RX in equation (1) is $RX^{-1}$, tristimulus values X'Y'Z' after correction can be converted into color information R'G'B' on the color image as follows:

$$\begin{pmatrix} R' \\ G' \\ B' \end{pmatrix} = RX^{-1} \begin{pmatrix} X' \\ Y' \\ Z' \end{pmatrix}. \quad (13)$$

The above-described processing is performed on all the pixels in the input image to obtain an output image having the color corrected as desired.

Second Exemplary Embodiment

Figure 6:
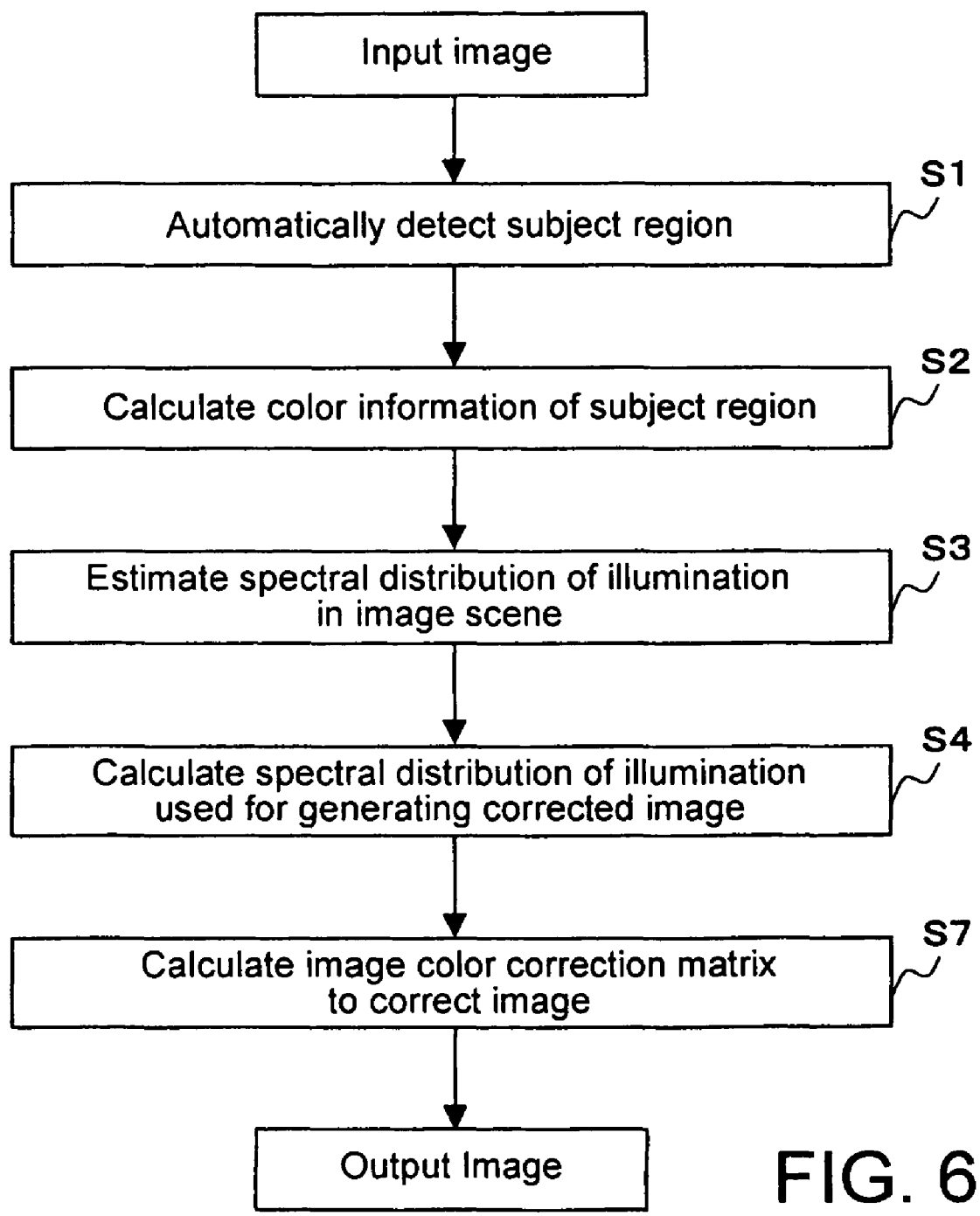
FIG. 6 is a flowchart showing a color correction method according to a second exemplary embodiment of the present invention.

Next, a color correction method according to a second exemplary embodiment of the present invention will be described with reference to FIG. 6. The color correction method in the second exemplary embodiment is a method for obtaining the same correction result as that of the color correction method in the first exemplary embodiment by replacing the correction processing (transform processing) from tristimulus values XYZ to X'Y'Z' performed in steps S5 and S6 in the first exemplary embodiment with a matrix transform shown in step S7. The processing in steps S1 to S4 in FIG. 6 is the same as those in the first exemplary embodiment, and the explanation for the same processing will not be repeated. Description will be made of step S7.

In step S7, after the completion of step S4, ideal surface reflectance R"(λ) of the objects is first modeled by using a finite dimensional linear model expressed by the weighted sum of lower-order basic vectors. Equation (8) shown above is thereby obtained.

R"(λ) shown by equation (8) is substituted in the observation equations about the surface reflectance R(λ) to obtain linear simultaneous equations (equation (9) shown above) with three unknowns about unknown characteristic parameters $b_1$ to $b_3$ expressing the colors of the objects. Parameters $b_1$ to $b_3$ can be obtained from the linear simultaneous equations.

Subsequently, spectral distribution $I_{adj}(\lambda)$ of the illumination already calculated in step S4 to be used at the time of correction is substituted in equations (2) to (4) to obtain equations (10) to (12) about tristimulus values X'Y'Z' after correction and ideal surface reflectance R"(λ) of the objects. R"(λ) shown by equation (8) is substituted in equations (10) to (12) to obtain equation (14):

$$\begin{pmatrix} X' \\ Y' \\ Z' \end{pmatrix} = \begin{pmatrix} N(x, r_1) & N(x, r_2) & N(x, r_3) \\ N(y, r_1) & N(y, r_2) & N(y, r_3) \\ N(z, r_1) & N(z, r_2) & N(z, r_3) \end{pmatrix} \begin{pmatrix} b_1 \\ b_2 \\ b_3 \end{pmatrix} + \begin{pmatrix} N(x, r_0) \\ N(y, r_0) \\ N(z, r_0) \end{pmatrix}. \quad (14)$$

Where, $N(x, r_i)$ (i=0 to 3) represents integral term of $\int I_{adj} r_i(\lambda) X(\lambda) d\lambda$. The same applies for y and z. Further, equation (9) is substituted in equation (14) to obtain equation (15):

$$\begin{pmatrix} X' \\ Y' \\ Z' \end{pmatrix} = \quad (15)$$

$$\begin{pmatrix} N(x,r_1) & N(x,r_2) & N(x,r_3) \\ N(y,r_1) & N(y,r_2) & N(y,r_3) \\ N(z,r_1) & N(z,r_2) & N(z,r_3) \end{pmatrix} \begin{pmatrix} M(x,r_1) & M(x,r_2) & M(x,r_3) \\ M(y,r_1) & M(y,r_2) & M(y,r_3) \\ M(z,r_1) & M(z,r_2) & M(z,r_3) \end{pmatrix}^{-1}$$

$$\begin{pmatrix} X - M(x,r_0) \\ Y - M(y,r_0) \\ Z - M(z,r_0) \end{pmatrix} + \begin{pmatrix} N(x,r_0) \\ N(y,r_0) \\ N(z,r_0) \end{pmatrix}.$$

Equation (15) can be simplified into following equation (16):

$$\begin{pmatrix} X' \\ Y' \\ Z' \end{pmatrix} = A \begin{pmatrix} X \\ Y \\ Z \end{pmatrix} + B. \quad (16)$$

Where, matrix A is a 3×3-matrix expressed by equation (17) shown below and matrix B is a 3×1-matrix expressed by equation (18) shown below. Each of these matrices is a constant matrix.

$$A = \begin{pmatrix} N(x,r_1) & N(x,r_2) & N(x,r_3) \\ N(y,r_1) & N(y,r_2) & N(y,r_3) \\ N(z,r_1) & N(z,r_2) & N(z,r_3) \end{pmatrix} \quad (17)$$

$$\begin{pmatrix} M(x,r_1) & M(x,r_2) & M(x,r_3) \\ M(y,r_1) & M(y,r_2) & M(y,r_3) \\ M(z,r_1) & M(z,r_2) & M(z,r_3) \end{pmatrix}^{-1}.$$

$$B = \begin{pmatrix} N(x,r_0) \\ N(y,r_0) \\ N(z,r_0) \end{pmatrix} - A \begin{pmatrix} M(x,r_0) \\ M(y,r_0) \\ M(z,r_0) \end{pmatrix} \quad (18)$$

In step S7, color correction processing by equation (16) is performed on all the pixels in the input image, followed by conversion into a device dependent color. The resulting image is supplied as an output image. "Device dependent color" means a color space dependent on an output destination device.

While the explanation has been made of a case where the input image and the device dependent color of the output image are RGB, the color correction method according to the present invention can be applied to images other than RGB images if a correspondence relationship is obtained between colors of the device dependent color and the tristimulus colors XYZ of the device independent color even in a case where the device dependent color is a device dependent color other than RGB, e.g., CMY or CMYK.

Figure 7:
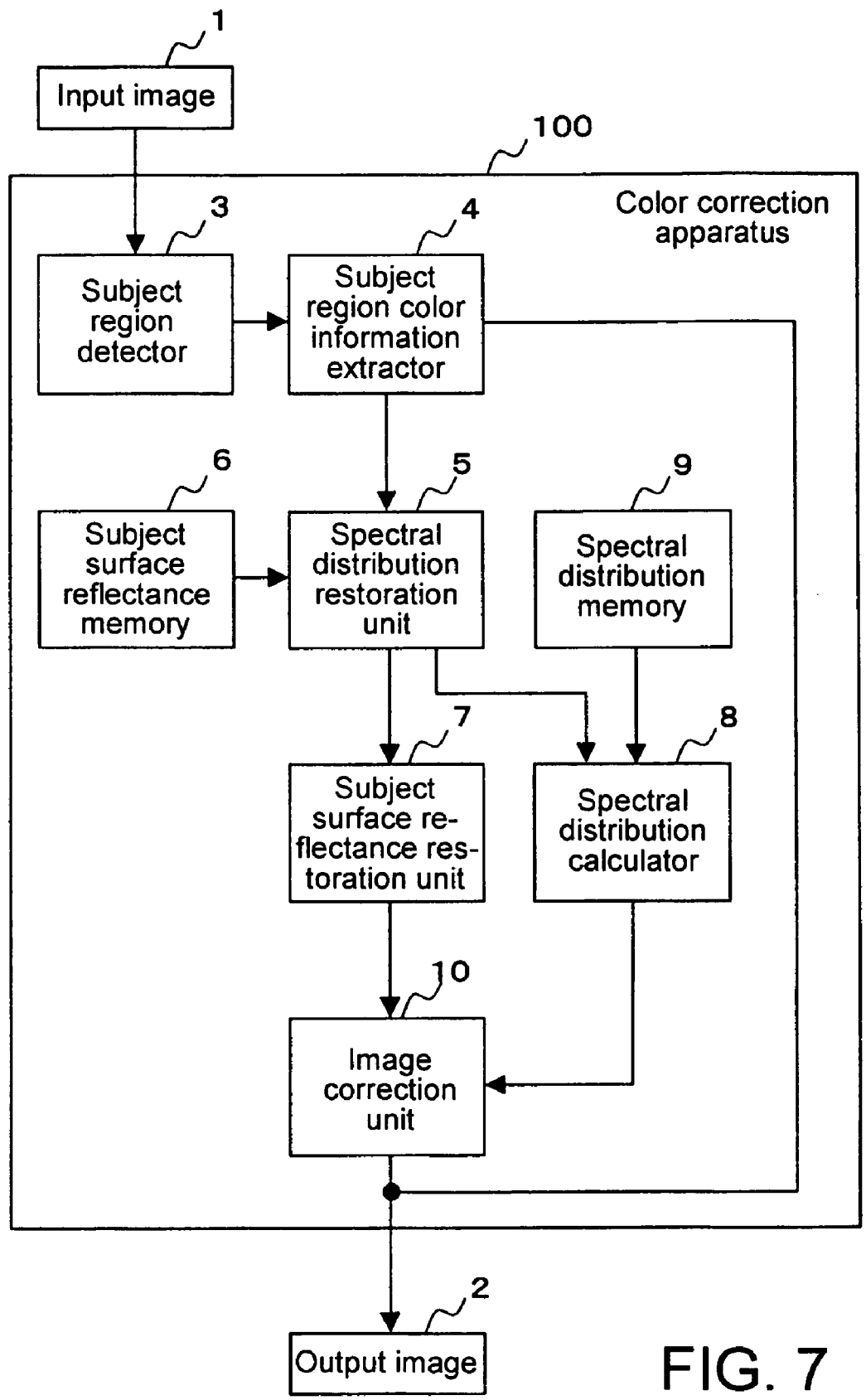
FIG. 7 is a block diagram showing a first example of a color correction apparatus according to the present invention.

Color Correction Apparatus:

A color correction apparatus according to the present invention will next be described. FIG. 7 shows a first example of the color correction apparatus according to the present invention. Color correction apparatus 100 shown in the figure is an apparatus which makes a color correction to input image 1 on the basis of the color correction method in the above-described first exemplary embodiment and outputs output image 2. More specifically, color correction apparatus 100 corrects input image 1 to generate output image 2 with an illumination condition different from the illumination condition in input image 1, and outputs output image 2.

Color correction apparatus 100 has: subject region detector 3 which detects a region of a particular subject from input image 1; subject region color information extractor 4 which extracts color information on the detected region; spectral distribution restoration unit 5 which restores a spectral distribution of illumination in input image 1 by using the extracted color information and the surface reflectance of the particular subject designated in advance; subject surface reflectance memory 6; surface reflectance restoration unit 7 which restores the surface reflectance in each pixel by using color information on each pixel of the input image and the spectral distribution of illumination restored by spectral distribution restoration unit 5; spectral distribution calculator 8 which calculates a spectral distribution of illumination in output image 2 by using the spectral distribution of illumination restored by spectral distribution restoration unit 5 and a spectral distribution of illumination designated as target illumination; spectral distribution memory 9 in which the spectral distribution of the target illumination is stored in advance; and image correction unit 10 which calculates color information on each pixel of output image 2 by using the surface reflectance in each pixel restored by surface reflectance restoration unit 7 and the spectral distribution of illumination in output image 2 calculated by spectral distribution calculator 8. As the particular subject in input image 1, a subject such as a human face whose color is determined to a certain degree is used, as described above. Color correction apparatus 100 is given the surface reflectance of the particular subject in advance. The given surface reflectance is stored in subject surface reflectance memory 6.

The operation of this color correction apparatus 100 will next be described.

When input image 1 is given, subject region detector 3 analyzes input image 1, detects a particular subject which has been assumed in advance, and outputs information indicating the region of the subject in the image. As a detection method, the above-described technique may be used. If no subject to be detected is detected from the image 1, this color correction apparatus 100 outputs input image 1 as output image 2 without changing input image 1.

Subsequently, subject region color information extractor 4 extracts, by the above-described method, color information on the subject region detected by subject region detector 3.

Spectral distribution restoration unit 5 restores the spectral distribution of illumination in the scene in the input image as the spectral distribution of illumination in input image 1 by using the color information on the subject region obtained by subject region color information extractor 4, a typical or representative surface reflectance in the subject region stored in subject surface reflectance memory 6, and basic vectors with which the spectral distribution of the illumination is modeled.

Subsequently, spectral distribution calculator 8 calculates a spectral distribution of illumination in an output image which is necessary at the time of formation of a corrected image. Spectral distribution calculator 8 calculates the spectral distribution of illumination in the output image by equations (6) and (7) and by using the spectral distribution of illumination in the input image restored by spectral distribution restoration unit 5 and the spectral distribution of target illumination stored in advance in spectral distribution memory 9.

On the other hand, surface reflectance restoration unit 7 restores the surface reflectance of the object in each pixel on the image from the restored spectral distribution of illumination in the input image and the pixel values in input image data. As methods of restoration of spectral characteristics in spectral distribution restoration unit 5 and surface reflectance restoration unit 7, techniques explained in the first exemplary embodiment may be used.

Image correction unit 10 calculates tristimulus values XYZ by equations (10) to (12) and by using the surface reflectance of the object in each pixel in the image and the spectral distribution of illumination in the output image. Image correction unit 10 converts the output image into a device dependent color (e.g., RGB) and outputs the converted image as output image 2.

In this color correction apparatus, subject region detector 3, subject region color information extractor 4, spectral distribution restoration unit 5, subject surface reflectance memory 6, surface reflectance restoration unit 7, spectral distribution calculator 8, spectral distribution memory 9 and image correction unit 10 may be respectively provided as separate units or may be realized by a CPU which operates in accordance with a program. In such a case, the program may be stored in a storage device connected to the CPU. That is, this color correction apparatus may be configured by using a computer having a storage device.

Figure 8:
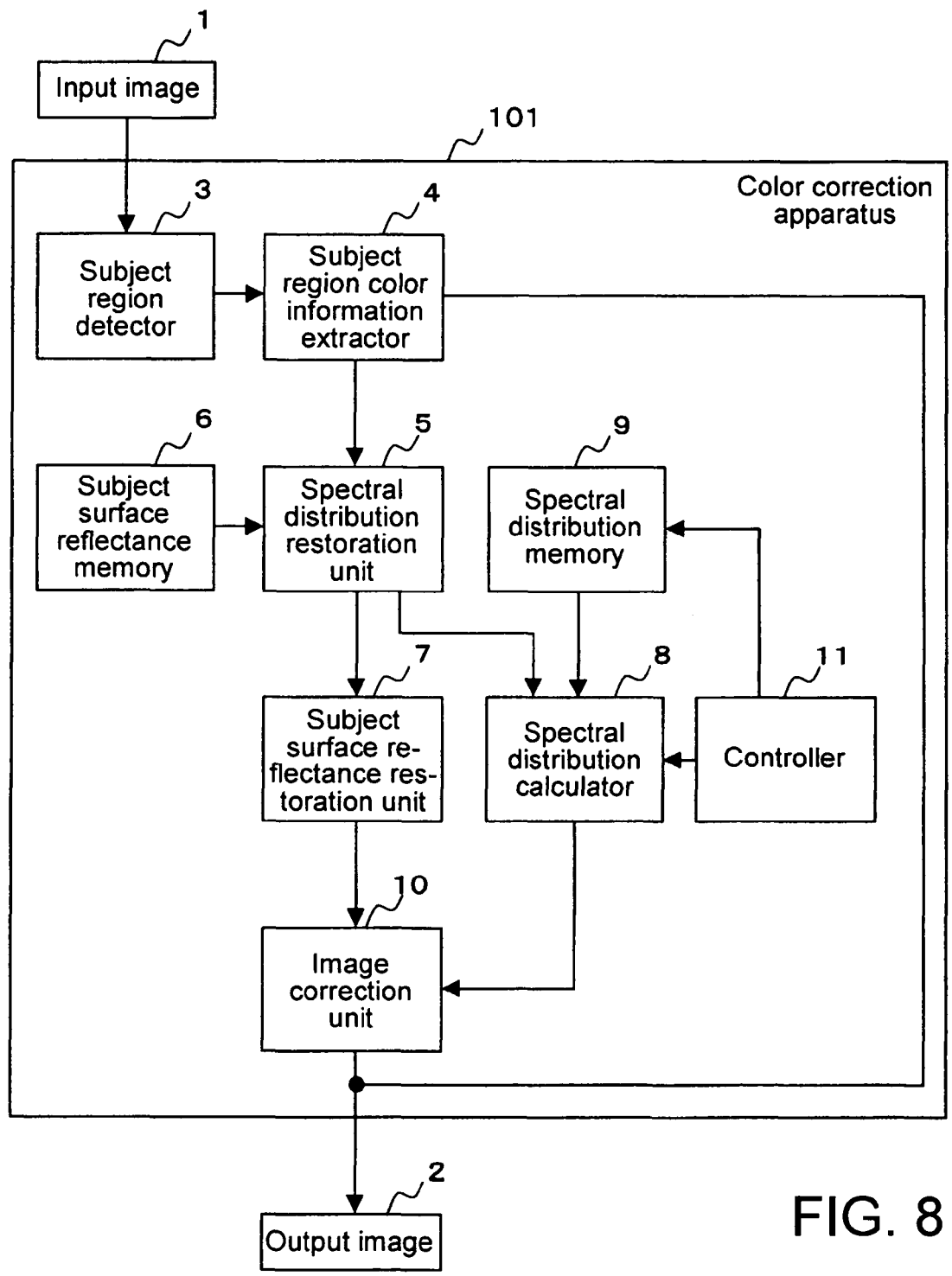
FIG. 8 is a block diagram showing a second example of the color correction apparatus according to the present invention.

FIG. 8 shows a second example of the color correction apparatus according to the present invention.

In color correction apparatus 101 shown in FIG. 8, controller 11 is added to color correction apparatus 100 shown in FIG. 7. Controller 11 performs control for enabling a user to designate value adj or function adjw($\lambda$) and outputs value adj or function adjw($\lambda$) designated by the user to spectral distribution calculator 8. Value adj or function adjw($\lambda$) is a value or a function used to control the mixing ratio of the spectral distribution of illumination in the input image and the spectral distribution of the desired target illumination when spectral distribution calculator 8 calculates the spectral distribution of illumination in the output image.

Figure 9:
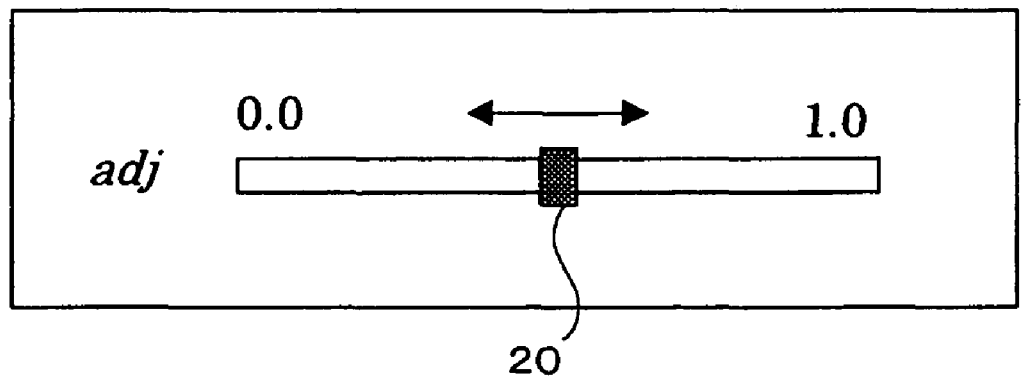
FIG. 9 is a diagram showing an example of a GUI for setting value adj, displayed by a controller.

FIG. 9 shows an example of a GUI (graphical user interface) displayed to a user by controller 10 to enable the user to set value adj. The user can adjusts value adj by moving a displayed slide bar 20 with a pointing device such as a mouse.

Figure 10:
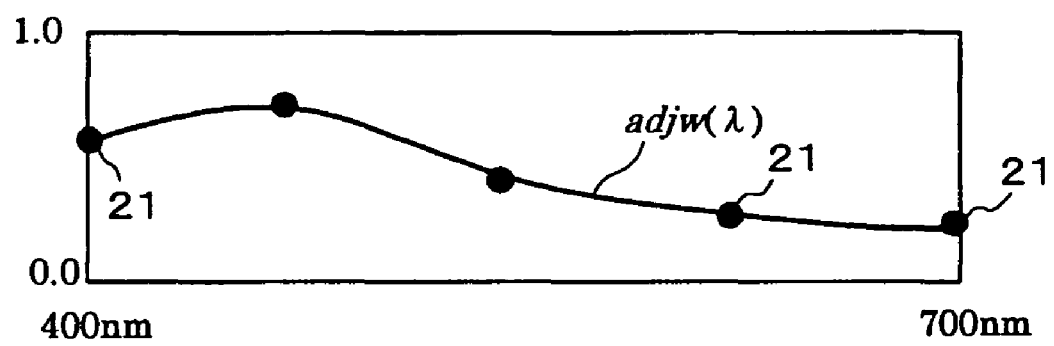
FIG. 10 is a diagram showing an example of a GUI for setting function adjw($\lambda$), displayed by a controller.

Similarly, FIG. 10 shows an example of a GUI displayed to a user by controller 11 to enable the user to set function adjw($\lambda$). The user can adjusts the waveform of adjw($\lambda$) passing through displayed control point 21 by moving control point 21 upward or downward through a mouse operation or the like. With respect to adjw($\lambda$) passing through control point 21, the function values at wavelengths different from that of the control point can be easily calculated by using spline interpolation or Lagrange interpolation. While five control points 21 are provided in the example shown in FIG. 10, the number of control points is arbitrary and addition or removal of control point 21 may be permitted.

While in the examples shown in FIGS. 9 and 10 adj and adjw($\lambda$) can be designated in the range from 0 to 1.0, the range of setting is not limited to 0 to 1.0. Enabling setting of a real value may suffice. Controller 11 reflects adj or adjw($\lambda$) set by a user in spectral distribution calculator 8.

Further, controller 11 has the function of enabling a user to designate as target illumination a color of illumination according to user's preference. When a color of target illumination is designated, a correlated color temperature for example may be used. From a correlated color temperature of CIE daylight, the corresponding spectral distribution can be calculated. A method of calculating a spectral distribution from a correlated color temperature is described in: The Color Science Association of Japan, "Color science handbook, new edition", Second Edition, University of Tokyo Press, Jun. 10, 1998, pp. 69-71. Since a chromaticity is temporarily calculated from a correlated color temperature in the course of calculation of a spectral distribution of CIE daylight, controller 11 may give a chromaticity for a color of target illumination. Further, controller 11 may give a file designating power at each wavelength for a spectral distribution of target illumination.

The color correction apparatus shown in FIG. 8 may also be constituted by a computer controlled by means of a program, as is the color collection apparatus shown in FIG. 7.

Figure 11:
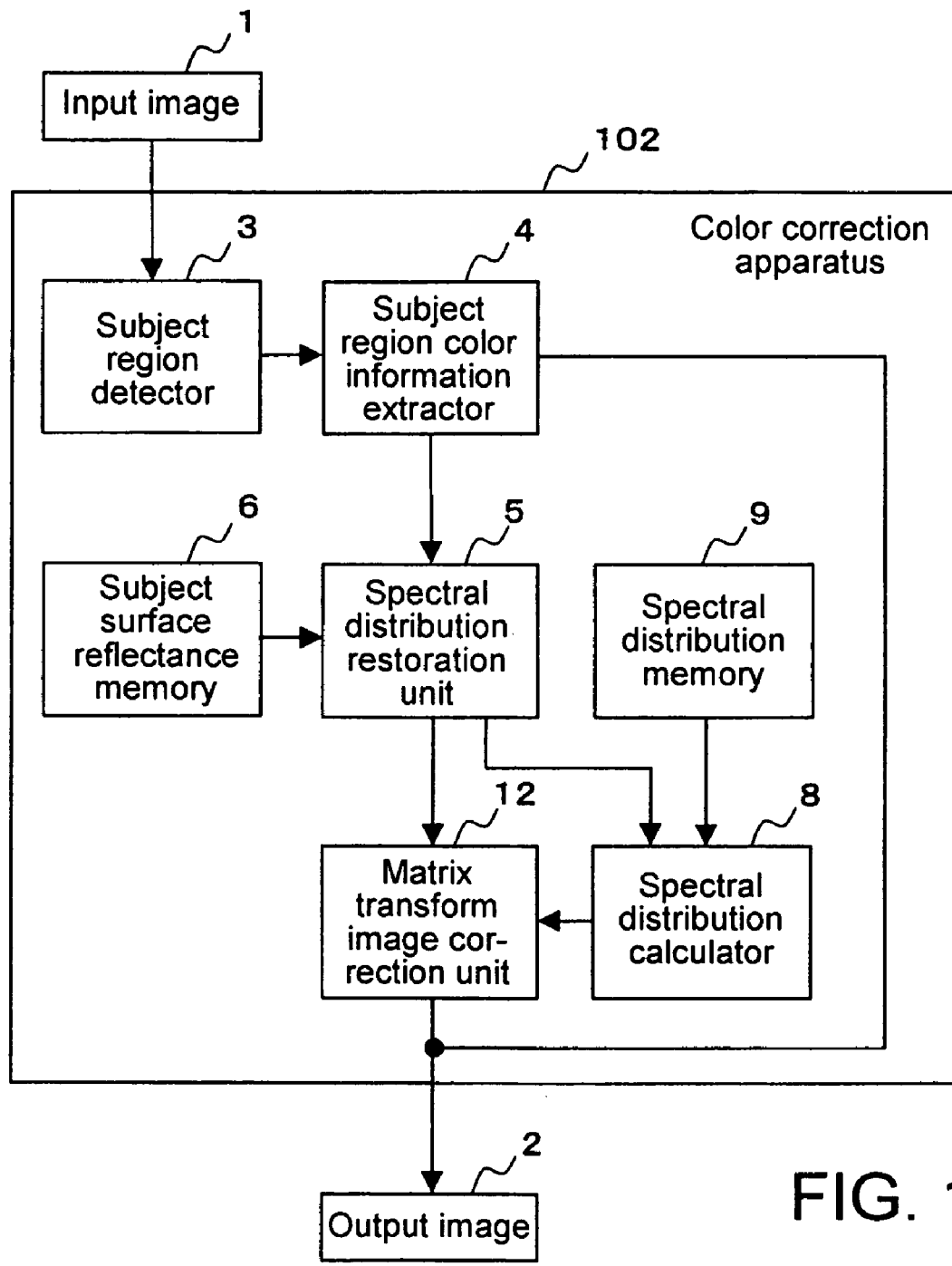
FIG. 11 is a block diagram showing a third example of the color correction apparatus according to the present invention.

FIG. 11 shows a third example of the color correction apparatus according to the present invention. Color correction apparatus 102 shown in the figure is an apparatus which makes a color correction to input image 1 on the basis of the color correction method in the above-described second exemplary embodiment and outputs output image 2. Color correction apparatus 102 has, in place of surface reflectance restoration unit 7 and image correction unit 10 in color correction apparatus 100 shown in FIG. 7, matrix transform image correction unit 12 which calculates color information on each pixel of an output image by using a constant matrix calculated from basic vectors used at the time of modeling of the surface reflectance in each pixel, the restored spectral distribution of illumination in input image 1 and the spectral distribution of illumination in the output image.

The operation of this color correction apparatus 102 will next be described.

Restoration of the spectral distribution of illumination in the input image by spectral distribution restoration unit 5 and calculation of the spectral distribution of illumination in the output image by spectral distribution calculator 8 are performed in the same manner as those in color correction apparatus 100 shown in FIG. 7. Subsequently, when matrix transform image correction unit 12 is given the spectral distribution of illumination in the input image restored by spectral distribution restoration unit 5, the spectral distribution of illumination in the output image calculated by spectral distribution calculator 8 and input image 1, it executes step S5 shown in FIG. 6 to calculates equation (16). Matrix transform image correction unit 12 performs color correction processing by equation (16) on all the pixels of input image 1, performs conversion into a device dependent color and outputs output image 2.

Also in this color correction apparatus 102, subject region detector 3, subject region color information extractor 4, spectral distribution restoration unit 5, subject surface reflectance memory 6, spectral distribution calculator 8, spectral distribution memory 9 and matrix transform image correction unit 12 may be respectively provided as separate units or may be realized by a CPU which operates in accordance with a program. Therefore this color correction apparatus may be configured by using a computer.

Further, as a fourth example of the color correction apparatus according to the present invention, a color correction apparatus having matrix transform image correction unit 12 in place of surface reflectance restoration unit 7 and image correction unit 10 shown in FIG. 8 can also be easily implemented. This color correction apparatus can be constituted by a computer controlled by means of a program.

INDUSTRIAL APPLICABILITY

The present invention can be applied to use in executing color correction including white balancing in an input/output device for color images. The present invention can also be used as color correction software or a color correction utility to any color images by being provided in the form of a program which runs on a computer system.

The invention claimed is:
1. A color correction method in which an input image is corrected to generate an output image with an illumination condition different from an illumination condition in the input image, the method comprising:

detecting a region of a particular subject from the input image and extracting color information on the region;

restoring a spectral distribution of illumination in the input image by using the extracted color information on the region of the particular subject and a surface reflectance of the particular subject designated in advance;

calculating a spectral distribution of illumination in the output image by mixing the restored spectral distribution of illumination in the input image and the spectral distribution of illumination designated as target illumination; and calculating color information on each pixel of the output image on the basis of color information on each pixel of the input image, the restored spectral distribution of illumination in the output image and the calculated spectral distribution of illumination in the output image.

2. The method according to claim 1, wherein calculating the color information includes:

restoring the surface reflectance in each pixel by using color information on each pixel of the input image and the restored spectral distribution of illumination in the input image; and calculating color information on each pixel of the output image by using the restored surface reflectance in each pixel and the calculated spectral distribution of illumination in the output image.

3. The method according to claim 1, wherein calculating the color information includes:

calculating color information on each pixel of the output image by using a constant matrix which is calculated from basic vectors used at the time of modeling of the surface reflectance in each pixel, the restored spectral distribution of illumination in the input image and the spectral distribution of illumination in the output image.

4. The method according to claim 1, wherein, in calculating the spectral distribution, the spectral distribution of illumination in the output image is calculated by mixing the restored spectral distribution of illumination in the input image and the spectral distribution of the target illumination at a constant ratio independent of wavelength through a visible light region.

5. The method according to claim 1, wherein, in calculating the spectral distribution, the spectral distribution of illumination in the output image is calculated by mixing the restored spectral distribution of illumination in the input image and the spectral distribution of the target illumination on the basis of a function dependent on wavelength through a visible light region.

6. The method according to claim 4, wherein the constant ratio is set by a user.

7. The method according to claim 5, wherein the function dependent on wavelength is set by a user.

8. A color correction apparatus which corrects an input image to generate an output image with an illumination condition different from an illumination condition in the input image, the apparatus comprising:

subject region color information extraction means for detecting a region of a particular subject from the input image and extracting color information on the region;

spectral distribution restoration means for restoring a spectral distribution of illumination in the input image by using the color information on the region of the particular subject extracted by the subject region color information extraction means and a surface reflectance of the particular subject designated in advance;

spectral distribution calculation means for calculating a spectral distribution of illumination in the output image by mixing the spectral distribution of illumination in the input image restored by the spectral distribution restoration means and the spectral distribution of illumination designated as target illumination; and output image generation means for calculating color information on each pixel of the output image on the basis of color information on each pixel of the input image, the restored spectral distribution of illumination in the output image and the calculated spectral distribution of illumination in the output image.

9. The color correction apparatus according to claim 8, wherein the output image generation means comprises:

surface reflectance restoration means for restoring the surface reflectance in each pixel by using color information on each pixel of the input image and the spectral distribution of illumination in the input image restored by the spectral distribution restoration means; and image correction means for calculating color information on each pixel of the output image by using the surface reflectance in each pixel restored by the surface reflectance restoration means and the spectral distribution of illumination in the output image calculated by the spectral distribution calculation means.

10. The apparatus according to claim 8, wherein the output image generation means comprises:

matrix transform image correction means for calculating color information on each pixel of the output image by using a constant matrix which is calculated from basic vectors used at the time of modeling of the surface reflectance in each pixel, the restored spectral distribution of illumination in the input image and the spectral distribution of illumination in the output image.

11. The apparatus according to claim 8, wherein the spectral distribution calculation means mixes the spectral distribution of illumination in the input image restored by the spectral distribution restoration means and the spectral distribution of the target illumination at a constant ratio independent of wavelength through a visible light region to calculate the spectral distribution of illumination in the output image.

12. The apparatus according to claim 8, wherein the spectral distribution calculation means mixes the spectral distribution of illumination in the input image restored by the spectral distribution restoration means and the spectral distribution of the target illumination on the basis of a function dependent on wavelength through a visible light region to calculate the spectral distribution of illumination in the output image.

13. The apparatus according to claim 11, further comprising a controller which enables a user to set the constant ratio and outputs the constant ratio to the spectral distribution calculation means.

14. The apparatus according to claim 12, further comprising a controller which enables a user to set the function dependent on wavelength and outputs the function to the spectral distribution calculation means.

15. A non-transitory computer-readable recording medium readable by a computer which is capable of executing processing for correcting an input image to generate an output image with an illumination condition different from an illumination condition in the input image, the recording medium storing a color correction program for making the computer execute:

processing for detecting a region of a particular subject from the input image and extracting color information on the region;

processing for restoring a spectral distribution of illumination in the input image by mixing the extracted color information on the region of the particular subject and a surface reflectance of the particular subject designated in advance;

processing for calculating a spectral distribution of illumination in the output image by using the restored spectral distribution of illumination in the input image and the spectral distribution of illumination designated as target illumination; and processing for calculating color information on each pixel of the output image on the basis of color information on each pixel of the input image, the restored spectral distribution of illumination in the input image and the calculated spectral distribution of illumination in the output image.

16. The non-transitory computer-readable recording medium according to claim 15, wherein the processing for calculating the color information includes:

processing for restoring the surface reflectance in each pixel by using color information on each pixel of the input image and the restored spectral distribution of illumination in the input image; and processing for calculating color information on each pixel of the output image by using the restored surface reflectance in each pixel and the calculated spectral distribution of illumination in the output image.

17. The non-transitory computer-readable recording medium according to claim 15, wherein the processing for calculating the color information includes:

processing for calculating color information on each pixel of the output image by using a constant matrix which is calculated from basic vectors used at the time of modeling of the surface reflectance in each pixel, the restored spectral distribution of illumination in the input image and the spectral distribution of illumination in the output image.

18. The non-transitory computer-readable recording medium according to claim 15, wherein, in the processing for calculating the spectral distribution, the spectral distribution of illumination in the output image is calculated by mixing the restored spectral distribution of illumination in the input image and the spectral distribution of the target illumination at a constant ratio independent of wavelength through a visible light region.

19. The non-transitory computer-readable recording medium according to claim 15, wherein, in the processing for calculating the spectral distribution, the spectral distribution of illumination in the output image is calculated by mixing the restored spectral distribution of illumination in the input image and the spectral distribution of the target illumination on the basis of a function dependent on wavelength through a visible light region.

* * * * *